United States Patent [19]

Beard, Jr. et al.

[11] Patent Number: 4,493,814
[45] Date of Patent: Jan. 15, 1985

[54] HIGH URANIUM UTILIZATION FUEL ROD FOR LIGHT WATER REACTORS

[75] Inventors: Charles L. Beard, Jr., Murrysville; Thomas M. Camden, Apollo, both of Pa.

[73] Assignee: Westinghouse Electric Corp., Pittsburgh, Pa.

[21] Appl. No.: 377,117

[22] Filed: May 11, 1982

[51] Int. Cl.³ .............................................. G21C 3/28
[52] U.S. Cl. ................................. 376/428; 376/172
[58] Field of Search ............. 376/428, 455, 435, 429, 376/426, 419, 172

[56] References Cited

U.S. PATENT DOCUMENTS

| 3,085,954 | 4/1963 | Stohr et al. | 376/426 |
|---|---|---|---|
| 3,145,149 | 8/1964 | Imhoff | 376/428 |
| 3,184,392 | 5/1965 | Blake | 376/455 |
| 3,211,627 | 10/1965 | Thorp | 376/426 |
| 3,619,366 | 11/1971 | Chubb et al. | 376/455 |
| 3,652,744 | 3/1972 | Dahlberg et al. | |
| 3,740,314 | 6/1973 | Neimark | 376/428 |
| 3,778,348 | 12/1973 | Sease et al. | 376/428 |
| 3,799,839 | 3/1974 | Fischer et al. | 376/419 |
| 4,355,002 | 10/1982 | Hosokawa et al. | 376/428 |

FOREIGN PATENT DOCUMENTS

| 43-26675 | 11/1968 | Japan | 376/428 |
|---|---|---|---|
| 0042588 | 4/1979 | Japan | 376/428 |
| 0017919 | 7/1979 | Japan | 376/428 |

Primary Examiner—Harvey E. Behrend

[57] ABSTRACT

An improved fuel rod for nuclear reactor fuel assemblies, said fuel rod having a region of relatively low density fuel pellets, causing the neutron-induced fission reaction to be more uniformly distributed along the rod.

4 Claims, 3 Drawing Figures

HIGH URANIUM UTILIZATION FUEL ROD FOR LIGHT WATER REACTORS

BACKGROUND OF THE INVENTION

1. Field of the Invention

This invention relates to fuel rods for fuel assemblies used in light water nuclear reactors.

2. Description of the Prior Art

Fuel assemblies for light water nuclear reactors comprise an array of cylindrical rods termed fuel rods. Each fuel rod contains a stack of pellets made of a fissile material such as uranium, especially uranium 235.

The reaction which produces energy in a nuclear reactor is the neutron-induced fission of uranium atoms. The fission reaction rate has a spatial distribution which is affected by the neutron flux distribution. Because the distribution of fission-inducing neutrons is approximately cosinosoidal along the axis of the fuel rods, the depletion of fissile fuel, or burnup, distribution along the length of a fuel rod is non-uniform, with the ends of the rod receiving less burnup than the center. This is inefficient utilization of the uranium 235 in the fuel rod ends.

One well-known improvement is to add pellets comprising naturally enriched uranium (0.711 weight percent U-235 in U-238) or depleted uranium (containing less than 0.711 wt. % U-235) at the rod ends. These pellets are called axial blanket pellets and function to generate plutonium by the absorption of neutrons by the uranium 238. Because plutonium is fissile, the blanket pellets improve the burnup distribution somewhat.

It is desired to provide an improved fuel rod design which accomplishes an improved axial burnup distribution.

SUMMARY OF THE INVENTION

A design for a high uranium utilization fuel rod for a light water reactor is provided in which both ends of the rod have a region of fuel pellets having a uranium density which is less than that of the central fuel pellets. Lower fuel density at the ends of the rod favorably redistributes the neutron flux and burnup of fuel.

DETAILED DESCRIPTION

Figure 1:
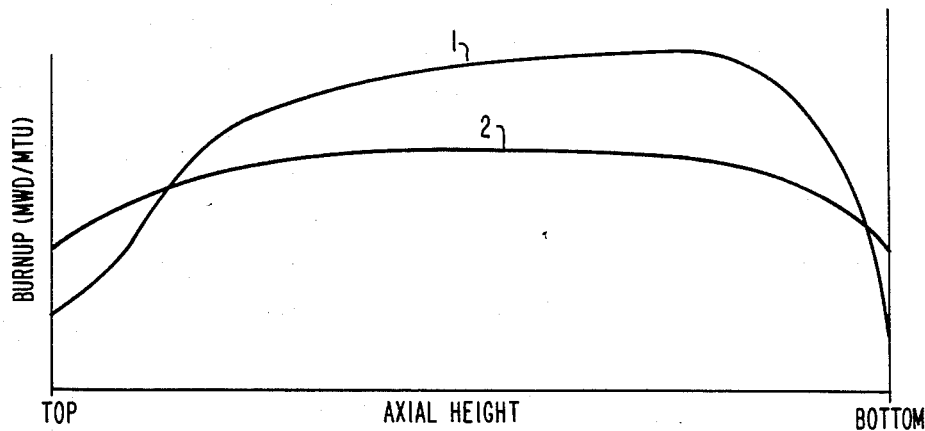
FIG. 1 is a graph of a typical prior art and altered axial burnup distribution.

A high uranium utilization fuel rod is provided which improves the neutron flux distribution and consequently the resulting burnup distribution approximately as illustrated by FIG. 1 in which curve 1 is representative of the axial burnup which occurs by the prior art and curve 2 is the axial burnup which occurs with the new design. The advantage of the improvement is the greatly decreased differential in burnup between the rod middle and rod ends from curve 1 to curve 2.

Figure 2:
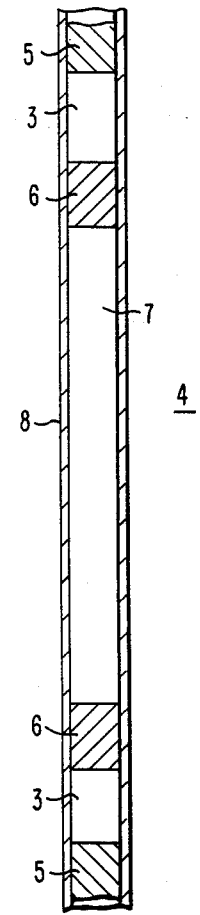
FIG. 2 is a schematic of a fuel rod.

The high uranium utilization fuel rod is an improvement over even the axial blanket concept. An axial blanket is still employed, but low density fuel pellets 3 are also included on the ends of the fuel rod 4 as shown in FIG. 2. Fuel rod 4 in FIG. 2 comprises a stack of pellets within a clad tube 8, which stack of pellets has two regions of "standard pellets" 6, two regions of "blanket pellets" 5 (one at each end of rod 4), and two "reduced density" pellet regions 3. FIG. 2 also shows an "optional" standard pellet region 7.

The low density fuel pellets 3 could be hollow annular pellets, (9 in FIG. 3) lower density pellets, smaller pellets or other concept designed to reduce the uranium loading per unit length. The U-235 enrichment of these low density pellets 3 would typically be the same as the standard pellets 6 and 7 of the same rod but would not have to be.

Figure 3:
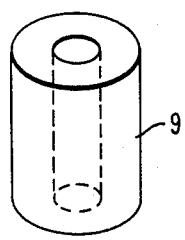
FIG. 3 is a schematic of a low density fuel pellet.

FIG. 3 is a schematic of a hollow center annular pellet 9. This embodiment, and the other concepts named above, achieves a lower uranium density per axial inch along rod 4 as compared to the density in regions 6 and 7.

The characteristics of the pellets used in the various regions are summarized in Table I.

TABLE I

| | |
|---|---|
| Blanket pellets (5) | Standard $UO_2$ pellets with a low enrichment of U-235 or thorium pellets. |
| Low density pellets (3) | U-235 enriched $UO_2$ pellets with a lower linear uranium loading than standard pellets, low density pellets, smaller pellets, etc. |
| Standard pellets (6) | U-235 enriched $UO_2$ pellets of the variety normally used in LW reactors. |
| Optional standard pellets (7) | U-235 enriched $UO_2$ pellets of the variety normally used in LW reactors, with a burnable absorber material added. This burnable absorber could be materials such as gadolinium, boron, $B_4C$, $ZrB_2$, etc. |

The improvement in utilization of uranium in the upper and lower ends of the fuel rod upon inclusion of low density pellets 3 is due to changes in the usage of neutrons occasioned by the change in the local ratio of fuel (uranium) to moderator (hydrogen); a ratio termed by nuclear engineers, the H/U ratio. Fewer neutrons leak out of the fuel region without engaging in fission reactions with a decreased H/U ratio.

A preferred embodiment of the invention is described in Table II.

TABLE II

| | |
|---|---|
| blanket pellets (region 5) | 4" stack of .711 wt. % enriched pellets having a density of: $.4949 \times 10^{+20}$ atoms/cc (U-235) $6.8257 \times 10^{+21}$ atoms/cc (U-238) |
| low density pellets (region 3) | 4" stack of 3.606 wt. % enriched pellets having a density of: $2.1333 \times 10^{+20}$ atoms/cc (U-235) $5.6305 \times 10^{+21}$ atoms/cc (U-238) |
| standard pellets (regions 6 and 7) | 128" stack of 3.606 wt. % enriched pellets having a density of: $2.5098 \times 10^{+20}$ atoms/cc (U-235) $6.6242 \times 10^{+21}$ atoms/cc (U-238) |

We claim:

1. A fuel rod for a fuel assembly for a light water nuclear reactor, said rod having a cladding tube and comprising:

a plurality of pellets comprising $UO_2$ retained within said cladding tube in axially stacked relationship, said stacked pellets comprising blanket pellets, low density fuel pellets and standard fuel pellets;

said blanket pellets positioned at both ends of said pellet stack and comprising $UO_2$ having added thereto a relatively low enrichment of U-235 as oxide;

said standard fuel pellets comprising U-235 enriched UO$_2$ pellets of the type normally used in light water nuclear reactors; and said low density fuel pellets positioned intermediate said standard pellets and said blanket pellets, said low density fuel pellets comprising U-235 enriched UO$_2$ but having a lower linear uranium loading than that of said standard fuel pellets.

2. The fuel rod as specified in claim 1, wherein said standard fuel pellets have a burnable absorber added thereto, said burnable absorber selected from the group consisting of gadolinium, boron, B$_4$C and ZrB$_2$.

3. A fuel rod for a fuel assembly for a light water nuclear reactor, said rod having a cladding tube and comprising:

a plurality of pellets comprising UO$_2$ retained within said cladding tube in axially stacked relationship, said stacked pellets comprising blanket pellets, low density fuel pellets and standard fuel pellets;

said blanket pellets positioned at both ends of said pellet stack and formed of uranium dioxide having added thereto 0.711 weight percent of U-235 as oxide and having a density of $0.4949 + 20$ atoms/cc of U-235 and $6.8257 + 21$ atoms/cc of U-238;

said standard fuel pellets formed of uranium dioxide having added thereto 3.606 weight percent of U-235 as oxide and having a density of $2.5098 + 20$ atoms/cc of U-235 and $6.6242 + 20$ atoms/cc of U-238; and said low density fuel pellets positioned intermediate said standard fuel pellets and said blanket pellets, said low density fuel pellets formed of uranium dioxide having added thereto 3.606 weight percent U-235 as oxide and having a density of $2.1333 + 20$ atoms/cc of U-235 and $5.6305 + 21$ atoms/cc of U-238.

4. The fuel rod as specified in claim 3, wherein said stacked pellets have a total length of about 144 inches, said blanket pellets comprise two stacks each being about four inches in length and positioned at each end of said pellet stack, said standard fuel pellets comprise about a 128 inch stack, and said low density pellets comprise two stacks each being about four inches in length with one of each stack of said low density pellets positioned intermediate said standard fuel pellets and said blanket pellets.

* * * * *